United States Patent
Pannell et al.

(10) Patent No.: US 7,668,104 B1
(45) Date of Patent: Feb. 23, 2010

(54) INTER-DEVICE FLOW CONTROL

(75) Inventors: Donald Pannell, Cupertino, CA (US);
Hong Yu Chou, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 691 days.

(21) Appl. No.: 11/291,477

(22) Filed: Dec. 1, 2005

Related U.S. Application Data

(63) Continuation of application No. 11/254,588, filed on Oct. 20, 2005.

(60) Provisional application No. 60/724,942, filed on Oct. 7, 2005, provisional application No. 60/679,845, filed on May 11, 2005, provisional application No. 60/623,557, filed on Oct. 29, 2004.

(51) Int. Cl.
*G08C 15/00* (2006.01)

(52) U.S. Cl. .................................. 370/237; 370/235

(58) Field of Classification Search ............... 370/230, 370/230.1, 231–235, 395.4, 445, 447, 237
See application file for complete search history.

(56) References Cited

U.S. PATENT DOCUMENTS

| | | | |
|---|---|---|---|
| 4,736,363 A | 4/1988 | Aubin et al. | |
| 5,187,591 A | 2/1993 | Guy et al. | |
| 5,621,726 A | 4/1997 | Murakimi | |
| 5,742,604 A | 4/1998 | Edsall et al. | |
| 5,790,554 A | 8/1998 | Pitcher et al. | |
| 5,959,990 A | 9/1999 | Frantz et al. | |
| 6,035,105 A | 3/2000 | McCloghrie et al. | |
| 6,049,528 A | 4/2000 | Hendel et al. | |
| 6,111,876 A | 8/2000 | Frantz et al. | |
| 6,151,322 A | 11/2000 | Viswanath et al. | |
| 6,192,397 B1 | 2/2001 | Thompson | |
| 6,252,849 B1 * | 6/2001 | Rom et al. | 370/230 |
| 6,405,258 B1 * | 6/2002 | Erimli et al. | 709/235 |
| 6,515,993 B1 | 2/2003 | Williams et al. | |
| 6,590,861 B1 | 7/2003 | Vepa et al. | |
| 7,243,171 B2 * | 7/2007 | Doshi et al. | 710/56 |
| 7,424,012 B2 * | 9/2008 | Tzeng | 370/389 |
| 2002/0138628 A1 | 9/2002 | Tingley et al. | |
| 2002/0176357 A1 * | 11/2002 | Lay | 370/229 |
| 2003/0185157 A1 * | 10/2003 | Chen et al. | 370/235 |

(Continued)

FOREIGN PATENT DOCUMENTS

EP 1 227 623 A2 1/2002

(Continued)

OTHER PUBLICATIONS

O Feuser et al, "On the Effects of the IEEE 802.3x Flow Control in Full-Duplex Ethernet LANs," Conference on Local Computer Networks, Oct. 1999, pp. 160-161.*

(Continued)

*Primary Examiner*—Donald L Mills

(57) ABSTRACT

A network switching system comprises a managing device and a first switching device comprising first and second ports. The first port communicates with the managing device. A queue communicates with the second port, stores frames for later output by the second port, and generates a congestion signal when filled above a threshold. A control module directs frames received from the second port to the first port, and selectively sends an outgoing flow control message to the first port when the congestion signal is present.

50 Claims, 7 Drawing Sheets

U.S. PATENT DOCUMENTS

2003/0210651 A1 * 11/2003 Tzeng et al. ............... 370/231

FOREIGN PATENT DOCUMENTS

| EP | 1271856 A1 | * | 1/2003 |
| WO | WO 9641456 A1 | * | 12/1996 |
| WO | WO 02088984 A1 | * | 11/2002 |

OTHER PUBLICATIONS

W Noureddine et al, "Selective Back-Pressure in Switched Ethernet LANs," Global Telecommunications Conference, 1999, vol. 2, pp. 1256-1263.*

D Lee et al, "FLORAX-Flow-Rate Based Hop by Hop Backpressure Control for IEEE 802.3x," 5th IEEE International Conference on High Speed Networks and Multimedai Communications, Jul. 2002, pp. 202-207.*

802.3-2002 Part 3—Information technology- Telecommunications and information exchange between systems- Local and metropolitan area networks- Specific requirements-Part 3: Carrier Sense Multiple Access with Collision Detection (CSMA/CD) access method and physical layer specifications- Section Three: This section includes Clauses 34 through 43 and Annexes 36A through 43C.

IEEE Std 802.3ac-1998 (Supplement to IEEE Std 802.3 1998 Edition) Information technology—Telecommunications and information exchange between systems—Local and metropolitan area networks—Specific requirements—Supplement to Carrier Sense Multiple Access with Collision Detection (CSMA/CS) Access Method and Physical Layer Specifications—Frame Extensions for Virtual Bridged Local Area Network (VLAN) Tagging on 802.3 Networks; LAN MAN Standards Committee of the IEEE Computer Society; Approved Sep. 16, 1998 by the IEEE-SA Standards Board; 19 pages.

MP0377 Application entitled: Method and Apparatus for Managing Packets in a Packet Switched Network; 77 pages.

IEEE Std 802.10-1998 (Revision IEEE Std 802.10-1992, incorporating IEEE Std 802.10b-1992, 802.10e-1993, 802.10f-1993, 802,10g-1995, and 802.10h-1997) IEEE Standards for Local and Metropolitan Area Networks: Standard for Interoperable LAN/MAN Security (SILS); LAN MAN Standards Committee of the IEEE Computer Society, Approved Sep. 17, 1998 by the IEEE SA-Standards Board, 116 pages.

IEEE Std 802.10ef-1993 and IEEE Std 802.10f-1993 (Supplements to IEEE Std 802.10-1992) IEEE Standards for Local and Metropolitan Area Networks: Supplements to Standard for Interoperable LAN/MAN Security (SILS), Secure Data Exchange (SDE) Sublayer Management (Subclause 2.8) and Recommended Practice for SDE on Ethernet V2.0 in IEEE 802 LANs (Annex 2H); Technical Committee on Computer Communications of the IEEE Computer Society; Approved Dec. 2, 1993 by the IEEE Standards Board; 48 pages.

IEEE Std 802.10g-1995 (Supplement to IEEE Std 802.10-1992) IEEE Standard for Local and Metropolitan Area Networks: Supplement to Standard for Interoperable LAN/MAN Security (SILS): Secure Data Exchange (SDE)—Security Label (Annexes 2I, 2J, and 2K), IEEE Computer Society, Apr. 16, 1996, 34 pages.

ISO/IEC Final CD 15802-3, IEEE P802.1D/D15, Nov. 24, 1997, Information technology—Telecommunications and information exchange between systems—ocal and metropolitan area networks—Common specifications— Part 3: Media Access Control (MAC) Bridges: Revision (Incorporating IEEE 802.1p: Traffic Class Expediting and Dynamic Multicast Filtering), LAN MAN Standards Committee of the IEEE Computer Society; 381 pages.

IEEE Std 802.3-2002 (Revision of IEEE Std 802.3 2000 Edition) IEEE Standard for Information technology—Telecommunications and information exchange between systems Local and metropolitan area networks—Specific requirements, Part 3: Carrier sense multiple access with collision detection (CSMA/CD) access method and physical layer specifications; IEEE Computer Society; LAN/MAN Standards Committee; Mar. 8, 2002; 578 pages.

802.3-2002 Part 2—Information technology-Telecommunications and information exchange between systems-Local and metropolitan area networks-Specific requirements-Part 3: Carrier Sense Multiple Access with Collision Detection (CSMA/CD) access method and physical layer specifications; Section Two; This section includes Clauses 21 through 33 and Annexes 22A through 32A.

* cited by examiner

| Congested Port Speed | Paused Port Speed | Assumed Cause | Action | Pause Time | Pause Time (/ 2048 ns) |
|---|---|---|---|---|---|
| 10 | 10 | Collisions or ≥2→1 | 2 to 1 reduction | 67,200ns * 1 * 12 | 394 |
| 10 | 100 | Speed Disparity | 10 to 1 reduction | 6,720ns * 9 *12 | 354 |
| 10 | 1000 | Speed Disparity | 100 to 1 reduction | 672ns * 99 * 12 | 390 |
| 100 | 10 | Collisions or ≥2→1 | 1.1 to 1 reduction | 67,200ns * 0.1 * 12 | 39 |
| 100 | 100 | Collisions or ≥2→1 | 2 to 1 reduction | 6,720ns * 1 * 12 | 39 |
| 100 | 1000 | Speed Disparity | 10 to 1 reduction | 672ns * 9 * 12 | 35 |
| 1000 | 10 | ≥2→1 | 1.01 to 1 reduction | 67,200ns * 0.01 * 12 | 4 |
| 1000 | 100 | ≥2→1 | 1.1 to 1 reduction | 6,720ns * 0.1 * 12 | 4 |
| 1000 | 1000 | ≥2→1 | 2 to 1 reduction | 672ns * 12 | 4 |

FIG. 9

INTER-DEVICE FLOW CONTROL

CROSS-REFERENCE TO RELATED APPLICATIONS

This application is a continuation of U.S. patent application Ser. No. 11/254,588 entitled "Inter-Device Flow Control", filed on Oct. 20, 2005, which claims priority on 35 U.S.C. § 119(e) on U.S. Provisional Application No. 60/724,942, entitled "Inter-Device Flow Control," filed Oct. 7, 2005, which claims priority on 35 U.S.C. § 119(e) of U.S. Provisional Application No. 60/679,845, entitled "Inter-Device Flow Control," filed May 11, 2005, which claims priority on 35 U.S.C. § 119(e) on U.S. Provisional Application No. 60/623,557, entitled "Inter-Device Flow Control," filed Oct. 29, 2004, the entire contents of each of which are hereby incorporated by reference herein.

FIELD OF THE INVENTION

The present invention relates to buffer management in a switch.

BACKGROUND OF THE INVENTION

Referring now to FIG. 1, a schematic illustration of a four-port switch 102 according to the prior art is depicted. In this example, port 2 is receiving stream B. A stream is a series of frames having a common source and destination. Stream B is destined for port 4 and is shown exiting port 4. Stream A, arriving on port 3, is bound for port 1 and is shown exiting port 1. The switch 102 may be connected to network devices that operate at different speeds—for example 10 Mbps, 100 Mbps, or 1 Gbps. If a network device connected to port 3 is operating at 1 Gbps and a device connected to port 1 is operating at 100 Mbps, port 1 may not be able to keep up with the data provided by port 3. The switch 102 may, instead of dropping frames, store frames in a queue 104. The queue 104 is finite, however, and after continued transmission at 1 Gbps to port 3, and only 100 Mbps out of port 1, the data will exceed the capacity of the queue 104 and frames will be dropped.

Once the queue 104 reaches a predetermined threshold 106, the switch 102 will instruct port 3 to issue flow control (if flow control is enabled) so that the queue 104 does not overflow and force the switch 102 to drop frames. The flow control may constitute providing backpressure or sending out a MAC PAUSE. While port 3 is paused and the queue 104 is decreasing, stream B can proceed from port 2 to port 4 without interference.

SUMMARY OF THE INVENTION

A network switching device comprises first and second ports. A queue communicates with the second port, stores frames for later output by the second port, and generates a congestion signal when filled above a threshold. A control module selectively sends an outgoing flow control message to the first port when the congestion signal is present, and selectively instructs the second port to assert flow control when a flow control message is received from the first port if the received flow control message designates the second port as a target.

In other features, the control module selectively instructs the second port to assert flow control when the received flow control message designates the switching device as a target. The control module sends the received flow control message to a third port when the received flow control message designates a target as a device distinct from the switching device. The threshold is dynamically set based upon a number of free buffers within the switching device. The threshold is set to a predetermined value based upon experimental results.

In other features, the second port asserts flow control until a timer expires. The control module selectively resets the timer to a reset time when a flow control message is received. The received flow control message contains remote port speed information. The reset time is based upon the remote port speed information. The flow control is asserted for a predetermined period based upon a line speed contained within the received flow control message. The control module selectively sends an outgoing flow control message when a flow control enable flag is set.

In other features, at least one of a structure of the outgoing flow control message is derived from the frames, a modified copy of one of the frames serves as the outgoing flow control message, the outgoing flow control message is based on an IEEE 802.3 frame, and the outgoing flow control message includes target device and target port information. The control module designates a target of the outgoing flow control message to be a port of a device corresponding to a frame that filled the queue above the threshold. The target of the outgoing flow control message is the port of the device corresponding to the frame that filled the queue above the threshold. The outgoing flow control message includes a layer three switch. The outgoing flow control message includes trunk information of a port of a device corresponding to a frame that filled the queue above the threshold.

In other features, the outgoing flow control message is based on an IEEE 802.3 frame, and the target device and target port information is stored in a four-byte IEEE 802.3ac frame extension. The outgoing flow control message is selectively set to high priority. The priority of the outgoing flow control message is selectively set to the high priority when a priority forcing flag is set. If a trunk includes the second port and a third port, the control module instructs both of the second and third ports to assert flow control. The flow control comprises one of a MAC PAUSE and backpressure. The flow control comprises storing frames received by the second port in an input buffer.

In other features, a switching system comprises first and second switching devices. The first port of the first switching device communicates with the first port of the second switching device via a first channel. The first channel is one of a network link and a specialized interconnection link.

A method for operating a network switching device comprises providing first and second ports; storing frames for later output by the second port in a queue; generating a congestion signal when the queue is filled above a threshold; selectively sending an outgoing flow control message to the first port when the congestion signal is present; and selectively instructing the second port to assert flow control when a flow control message is received from the first port if the received flow control message designates the second port as a target.

In other features, the method comprises selectively instructing the second port to assert flow control when the received flow control message designates the switching device as a target. The method comprises sending the received flow control message to a third port when the received flow control message designates a target as a device distinct from the switching device. The method comprises dynamically setting the threshold based upon a number of free buffers within the switching device. The method comprises setting the threshold to a predetermined value based upon experimental results. The method comprises providing a timer, wherein the second port asserts flow control until the timer expires; and selectively resetting the timer to a reset time when a flow control message is received, wherein the received flow control message contains remote port speed information and wherein the reset time is based upon the remote port speed information.

In other features, the method comprises asserting the flow control for a predetermined period based upon a line speed contained within the received flow control message. The method comprises selectively sending an outgoing flow control message when a flow control enable flag is set. At least one of: deriving a structure of the outgoing flow control message from the frames; using a modified copy of one of the frames as the outgoing flow control message; basing the outgoing flow control message on an IEEE 802.3 frame; and including target device and target port information in the outgoing flow control message.

In other features, the method comprises designating a target of the outgoing flow control message to be a port of a device corresponding to a frame that filled the queue above the threshold. The target of the outgoing flow control message is the port of the device corresponding to the frame that filled the queue above the threshold. The outgoing flow control message includes a layer three switch. The outgoing flow control message includes trunk information of a port of a device corresponding to a frame that filled the queue above the threshold. The outgoing flow control message is based on an IEEE 802.3 frame, and the target device and target port information is stored in a four-byte IEEE 802.3ac frame extension. The method comprises selectively setting the outgoing flow control message to high priority wherein the priority of the outgoing flow control message is selectively set to the high priority when a priority forcing flag is set.

In other features, the method comprises providing a third port; and instructing both of the second and third ports to assert flow control if a trunk includes the second and third ports. The flow control comprises one of a MAC PAUSE and backpressure. The method comprises storing frames received by the second port in an input buffer. The method comprises providing first and second switching devices, wherein the first port of the first switching device communicates with the first port of the second switching device via a first channel. The first channel is one of a network link and a specialized interconnection link.

A network switching device comprises first and second port means for communicating. Queue means communicates with the second port means for storing frames for later output by the second port means, and for generating a congestion signal when filled above a threshold. Control means selectively sends an outgoing flow control message to the first port means when the congestion signal is present, and selectively instructs the second port means to assert flow control when a flow control message is received from the first port means if the received flow control message designates the second port means as a target.

In other features, the control means selectively instructs the second port means to assert flow control when the received flow control message designates the switching device as a target. The control means sends the received flow control message to a third port means for communicating when the received flow control message designates a target as a device distinct from the switching device. The threshold is dynamically set based upon a number of free buffers within the switching device. The threshold is set to a predetermined value based upon experimental results. The second port means asserts flow control until timing means for timing expires. The control means selectively resets the timing means to a reset time when a flow control message is received. The received flow control message contains remote port speed information. The reset time is based upon the remote port speed information. The flow control is asserted for a predetermined period based upon a line speed contained within the received flow control message. The control means selectively sends an outgoing flow control message when a flow control enable flag is set. At least one of: a structure of the outgoing flow control message is derived from the frames; a modified copy of one of the frames serves as the outgoing flow control message; the outgoing flow control message is based on an IEEE 802.3 frame; and the outgoing flow control message includes target device and target port means information.

In other features, the control means designates a target of the outgoing flow control message to be a port of a device corresponding to a frame that filled the queue means above the threshold. The target of the outgoing flow control message is the port of the device corresponding to the frame that filled the queue means above the threshold. The outgoing flow control message includes a layer three switch. The outgoing flow control message includes trunk information of a port means of a device corresponding to a frame that filled the queue means above the threshold. The outgoing flow control message is based on an IEEE 802.3 frame, and the target device and target port means information is stored in a four-byte IEEE 802.3ac frame extension. The outgoing flow control message is selectively set to high priority and wherein the priority of the outgoing flow control message is selectively set to the high priority when a priority forcing flag is set.

In other features, if a trunk includes the second port means and third port means, the control means instructs both of the second and third port means to assert flow control. The flow control comprises one of a MAC PAUSE and backpressure. Input buffer means stores data for the second port means. The flow control comprises storing frames received by the second port means in the input buffer means.

A switching system comprises first and second switching devices The first port means of the first switching device communicates with the first port means of the second switching device via a first channel. The first channel is one of a network link and a specialized interconnection link.

A computer program executable by a processor for operating a network switching device comprises providing first and second ports; storing frames for later output by the second port in a queue; generating a congestion signal when the queue is filled above a threshold; selectively sending an outgoing flow control message to the first port when the congestion signal is present; and selectively instructing the second port to assert flow control when a flow control message is received from the first port if the received flow control message designates the second port as a target.

In other features, the computer program comprises selectively instructing the second port to assert flow control when the received flow control message designates the switching device as a target. The computer program comprises sending the received flow control message to a third port when the received flow control message designates a target as a device distinct from the switching device. The computer program comprises dynamically setting the threshold based upon a number of free buffers within the switching device. The computer program comprises setting the threshold to a predetermined value based upon experimental results. The computer program comprises providing a timer, wherein the second port asserts flow control until the timer expires; and selectively resetting the timer to a reset time when a flow control message is received, wherein the received flow control message contains remote port speed information and wherein the reset time is based upon the remote port speed information.

In other features, the computer program comprises asserting the flow control for a predetermined period based upon a line speed contained within the received flow control message. The computer program comprises selectively sending an outgoing flow control message when a flow control enable flag is set. At least one of: deriving a structure of the outgoing flow control message from the frames using; a modified copy of one of the frames as the outgoing flow control message; the outgoing flow control message is based on an IEEE 802.3 frame; and including target device and target port information in the outgoing flow control message.

In other features, the computer program comprises designating a target of the outgoing flow control message to be a port of a device corresponding to a frame that filled the queue above the threshold. The target of the outgoing flow control message is the port of the device corresponding to the frame that filled the queue above the threshold. The outgoing flow control message includes a layer three switch. The outgoing flow control message includes trunk information of a port of a device corresponding to a frame that filled the queue above the threshold. The outgoing flow control message is based on an IEEE 802.3 frame, and the target device and target port information is stored in a four-byte IEEE 802.3ac frame extension. The computer program comprises selectively setting the outgoing flow control message to high priority The priority of the outgoing flow control message is selectively set to the high priority when a priority forcing flag is set.

In other features, the computer program comprises providing a third port; and instructing both of the second and third ports to assert flow control if a trunk includes the second and third ports. The flow control comprises one of a MAC PAUSE and backpressure. The computer program comprises storing frames received by the second port in an input buffer. The computer program comprises providing first and second switching devices. The first port of the first switching device communicates with the first port of the second switching device via a first channel. The first channel is one of a network link and a specialized interconnection link.

A network switching system comprises a managing device. A first switching device comprises first and second ports. The first port communicates with the managing device. A queue communicates with the second port, stores frames for later output by the second port, and generates a congestion signal when filled above a threshold. A control module directs frames received from the second port to the first port, and selectively sends an outgoing flow control message to the first port when the congestion signal is present.

In other features, the managing device uses the outgoing flow control messages to determine a rate at which to send data frames to the first switching device. The managing device communicates with the first port via one of a network link and a dedicated interconnection link. At least one of the threshold is dynamically set based upon a number of free buffers within the first switching device and the threshold is set to a predetermined value based upon experimental results. The control module selectively instructs the second port to assert flow control when a flow control message is received from the first port if the received flow control message designates the second port as a target. The first switching device further comprises a timer. The second port asserts flow control until the timer expires. The control module selectively resets the timer to a reset time when a flow control message is received, wherein the received flow control message contains remote port speed information. The reset time is based upon the remote port speed information.

In other features, the control module selectively resets the timer when the reset time is greater than a current value of the timer. If a trunk includes the second port and a third port, the control module instructs both of the second and third ports to assert flow control. The flow control comprises one of a MAC PAUSE and backpressure. The first switching device further comprises an input buffer for the second port. The flow control comprises storing frames received by the second port in the input buffer. The control module selectively sends an outgoing flow control message when a flow control enable flag is set. At least one of: a modified copy of one of the frames serves as the outgoing flow control message; the outgoing flow control message is based on an IEEE 802.3 frame; the outgoing flow control message includes target device and target port information; the control module designates a target of the outgoing flow control message to be a port of a device corresponding to a frame that filled the queue above the threshold; and the target of the outgoing flow control message is the port of the device corresponding to the frame that filled the queue above the threshold. The outgoing flow control message includes trunk information of a port of a device corresponding to a frame that filled the queue above the threshold.

In other features, the outgoing flow control message includes a speed of the second port. The outgoing flow control message is based on an IEEE 802.3 frame, and the speed is stored in a four-byte IEEE 802.3ac frame extension. A priority of the outgoing flow control message is selectively set to high priority. The priority of the outgoing flow control message is selectively set to the high priority when a priority forcing flag is set. The managing device includes one of a layer two switch and a layer three switch. The first switching device further comprises a third port. The control module directs frames received from the third port to the first port. The managing device uses the outgoing flow control messages from both the first switching device and a second switching device to determine rates at which to send frames to the first and second switching devices, respectively.

A network switching system comprises managing means for managing. First switching means for switching comprises first and second port means for communicating. The first port means communicates with the managing means. Queue means for storing communicates with the second port means, stores frames for later output by the second port means, and generates a congestion signal when filled above a threshold. Control means directs frames received from the second port means to the first port means, and selectively sends an outgoing flow control message to the first port means when the congestion signal is present.

In other features, the managing means uses the outgoing flow control messages to determine a rate at which to send data frames to the first switching means. The managing means communicates with the first port means via one of a network link and a dedicated interconnection link. At least one of the threshold is dynamically set based upon a number of free buffers within the first switching means and the threshold is set to a predetermined value based upon experimental results. The control means selectively instructs the second port means to assert flow control when a flow control message is received from the first port means if the received flow control message designates the second port means as a target. The first switching means further comprises a timing means. The second port means asserts flow control until the timing means expires. The control means selectively resets the timing means to a reset time when a flow control message is received. The received flow control message contains remote port means speed information and wherein the reset time is based upon the remote port means speed information. The control means selectively resets the timing means when the reset time is greater than a current value of the timing means.

In other features, if a trunk includes the second port means and third port means for communicating, the control means instructs both of the second and third port means to assert flow control. The flow control comprises one of a MAC PAUSE and backpressure. The first switching means further comprises input buffer means for storing for the second port means, wherein the flow control comprises storing frames received by the second port means in the input buffer. The control means selectively sends an outgoing flow control message when a flow control enable flag is set. At least one of: a modified copy of one of the frames serves as the outgoing flow control message; the outgoing flow control message is based on an IEEE 802.3 frame; the outgoing flow control message includes target device and target port information; the control means designates a target of the outgoing flow control message to be a port means of a device corresponding to a frame that filled the queue means above the threshold; and the target of the outgoing flow control message is the port means of the device corresponding to the frame that filled the queue means above the threshold.

In other features, the outgoing flow control message includes trunk information of a port of a device corresponding to a frame that filled the queue means above the threshold. The outgoing flow control message includes a speed of the second port means. The outgoing flow control message is based on an IEEE 802.3 frame, and the speed is stored in a four-byte IEEE 802.3ac frame extension. A priority of the outgoing flow control message is selectively set to high priority. The priority of the outgoing flow control message is selectively set to the high priority when a priority forcing flag is set. The managing means includes one of a layer two switch and a layer three switch. The first switching means further comprises third port means for communicating, and wherein the control means directs frames received from the third port means to the first port means. The managing means uses the outgoing flow control messages from both the first and second switching means to determine rates at which to send frames to the first and second switching means, respectively.

A system with switching capability comprises a controlling device. A first switching device comprises first and second ports. The first port communicates with the controlling device. A control module selectively instructs the second port to assert flow control when a flow control message is received from the first port if the received flow control message designates the second port as a target.

In other features, the controlling device sends flow control messages to the first switching device to limit a rate of data flow to the controlling device. The second port asserts flow control until a timer expires. The control module selectively resets the timer to a reset time when a flow control message is received. The received flow control message contains remote port speed information. The reset time is based upon the remote port speed information. The received flow control message contains remote port speed information. The reset time is selected from a first table using the remote port speed information. The control module selectively resets the timer when the reset time is greater than a current value of the timer.

In other features, the flow control is asserted for a predetermined period and wherein the predetermined period is based upon at least one of a parameter contained within the received flow control message and selected from a table based upon the parameter. If a trunk includes the second and third ports, the control module instructs both of the second port and a third port to assert flow control. The flow control comprises one of a MAC PAUSE and backpressure. The first switching device further comprises an input buffer for the second port. The flow control comprises storing frames received by the second port in the input buffer. The controlling device communicates with the first port via at least one of a network link and a dedicated interconnection link. The controlling module includes a central processing unit (CPU).

In other features, a queue communicates with the second port, stores frames for later output by the second port, and generates a congestion signal when filled above a threshold. The control module selectively sends an outgoing flow control message to the first port when the congestion signal is present. The threshold is dynamically set based upon a number of free buffers within the switching device. The threshold is set to a predetermined value based upon experimental results. The control module selectively sends an outgoing flow control message when a flow control enable flag is set. The outgoing flow control message is based on an IEEE 802.3 frame. The outgoing flow control message includes a speed of the second port. The outgoing flow control message is based on an IEEE 802.3 frame, and the speed is stored in a four-byte IEEE 802.3ac frame extension. A priority of the outgoing flow control message is selectively set to high priority when a priority forcing flag is set.

A system with switching capability comprises controlling device means for controlling. First switching means for switching comprises first and second port means for communicating. The first port means communicates with the controlling device means. Control means for selectively instructing the second port means to assert flow control when a flow control message is received from the first port means if the received flow control message designates the second port means as a target. The controlling device means sends flow control messages to the first switching means to limit a rate of data flow to the controlling device means.

In other features, the second port means asserts flow control until the timing means expires. The control means selectively resets the timing means to a reset time when a flow control message is received. The received flow control message contains remote port speed information and wherein the reset time is based upon the remote port speed information. The received flow control message contains remote port means speed information. The reset time is selected from the first storing means using the remote port speed information. The control means selectively resets the timing means when the reset time is greater than a current value of the timing means. The flow control is asserted for a predetermined period. The predetermined period is based upon at least one of a parameter contained within the received flow control message and selected from a table based upon the parameter. If a trunk includes the second port means and third port means for communicating, the control means instructs both of the second and third port means to assert flow control.

In other features, the flow control comprises one of a MAC PAUSE and backpressure. The first switching means further comprises input buffer means for storing data for the second port means, wherein the flow control comprises storing frames received by the second port means in the input buffer. The controlling device means communicates with the first port means via at least one of a network link and a dedicated interconnection link. The controlling device means includes a central processing unit (CPU). Queue means communicates with the second port means, stores frames for later output by the second port means, and generates a congestion signal when filled above a threshold. The control means selectively sends an outgoing flow control message to the first port means when the congestion signal is present.

In other features, the threshold is dynamically set based upon a number of free buffers within the switching means. The threshold is set to a predetermined value based upon experimental results. The control means selectively sends an outgoing flow control message when a flow control enable flag is set. The outgoing flow control message is based on an IEEE 802.3 frame. The outgoing flow control message includes a speed of the second port means. The outgoing flow control message is based on an IEEE 802.3 frame, and the speed is stored in a four-byte IEEE 802.3ac frame extension. A priority of the outgoing flow control message is selectively set to high priority when a priority forcing flag is set.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a table of initial assumptions for determining port pause times.

DETAILED DESCRIPTION OF THE PREFERRED EMBODIMENTS

Figure 1:
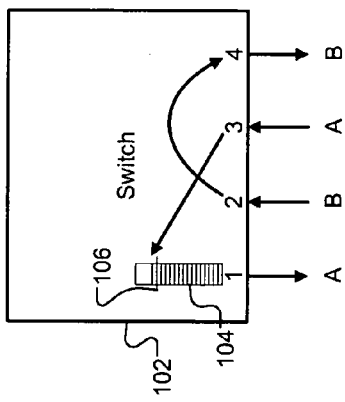
FIG. 1 is a schematic illustration of a four-port switch according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
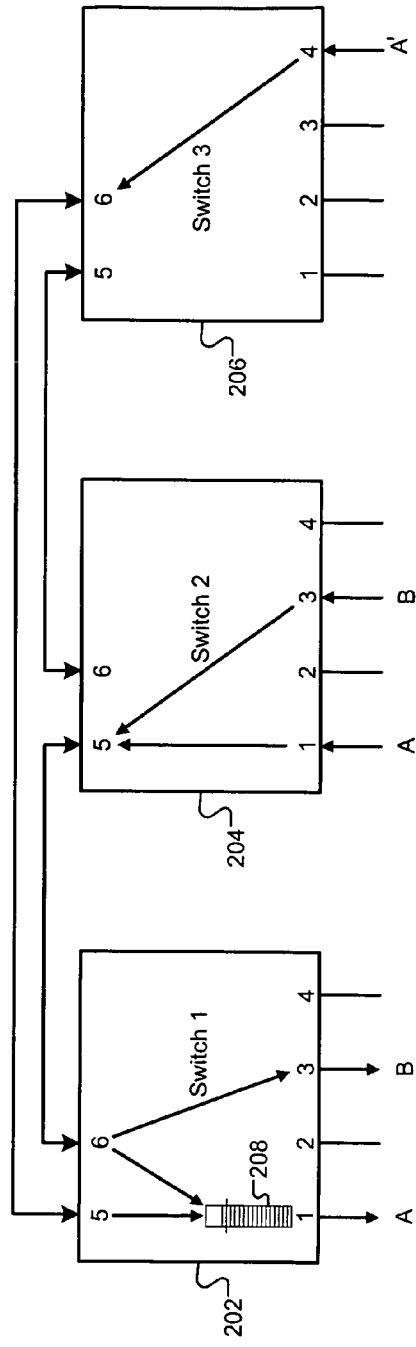
FIG. 2 is a functional block diagram demonstrating an exemplary interconnection of three six-port switches.

Referring now to FIG. 2, a block diagram demonstrates an exemplary interconnection of three six-port switches, 202, 204, and 206. Ports 5 and 6 of the three switches 202, 204, and 206, are regular ports that have been configured to be interconnection ports, forming an aggregate switch with a greater port count. Alternately, they could be dedicated interconnection ports. One skilled in the art will recognize that switches may have greater or fewer number of ports and may be interconnected in groups of two or more switches. In addition, a single port, two ports, or more than two ports can be used for interconnection purposes. In this example, a sixth port of the first switch 202 communicates with a fifth port of the second switch 204. A sixth port of the second switch 204 communicates with a fifth port of the third switch 206. A sixth port of the third switch 206 communicates with a fifth port of the first switch 202.

In this example, stream A arrives at a first port of the second switch 204 and is destined for a first port of the first switch 202. Stream B arrives at a third port of the second switch 204 and is destined for a third port of the first switch 202. Stream A' arrives on a fourth port of the third switch 206 and is also destined for the first port of the first switch 202. Stream A and stream B are communicated to the sixth port of the first switch 202 by the fifth port of the second switch 204. Stream A' is communicated to the fifth port of the first switch 202 by the sixth port of the third switch 206.

If a network device connected to the first port of the second switch 204 operates at a rate of 1 Gbps, and a network device connected to the first port of the first switch 202 operates at something less, such as 10 Mbps or 100 Mbps, a queue 208 for the first port of the first switch 202 may fill up. Once it reaches a certain threshold (which may be static or dynamic), the first switch 202 would traditionally use flow control to prevent the sixth port of the first switch 202 from adding to the queue 208. This in turn prevents the fifth port of the second switch 204 from transmitting either stream A or stream B to the first switch 202. Stream B, which may be entering the third port of the second switch 204 at 100 Mbps and leaving the third port of the first switch 202 at 100 Mbps, would then be blocked along with stream A. This phenomenon, where an uncongested stream is blocked because of the congestion of a different stream, is referred to as head-of-line blocking.

Blocking can occur for a single stream between two ports operating at the same speed when the target port experiences downstream flow control or collisions. Blocking can also occur when two streams, operating at the same speed, are directed to a single port operating at that same speed. This is demonstrated in FIG. 2 by stream A'. If streams A and A' are received at 10 Mbps, and are directed to a network device connected to the first port of the first switch 202, also operating at 10 Mbps, the first port of the first switch 202 may receive twice as much data as it can transmit. As a result, the queue 208 will fill up. The fifth and sixth ports of the first switch 202 would then both be intermittently blocked to allow the queue 208 to drain, once again causing head-of-line blocking for stream B.

It would be preferable for stream A to be blocked or buffered at the first port of the second switch 204, so that stream B, the uncongested stream, can transmit at full speed. A system according to the principles of the present invention allows stream A, arriving at the first port of the second switch, and stream A', arriving at the fourth port of the third switch, to experience flow control. Flow control may take the form of MAC PAUSE for a full duplex connection, or backpressure for a half duplex connection. Flow control may also involve storing incoming frames in an input queue of the ingress port. This approach is most effective when congestion-causing bursts are of short duration. Otherwise, the input queue will fill quickly, and another method of flow control will have to be employed to prevent dropping frames.

In order for a switch to issue flow control based on congestion within another device, the switch needs to be made aware of congestion information. Embedding such information in standard frames that can be communicated between the devices using existing port interconnections obviates the need for additional circuitry. Flow control congestion messages can be marked with a higher priority to ensure they will arrive as quickly as possible, ahead of standard data frames. Out-of-band signals could also be used to communicate flow control congestion information from one switch to another. This has a greater physical cost in terms of chip pins or circuit board traces, and requires extra send and receive circuitry within each switch.

If a frame from stream A increases the queue 208 past the defined threshold, a flow control congestion message can be sent to the second switch 204. The second switch 204 asserts flow control on port 1, from which stream A originates. Likewise, if a frame from stream A' increases the queue 208 past the defined threshold, the third switch 206 will also receive a flow control congestion message. In this way, flow control across multiple ports can be handled without any tracking circuitry within the queue 208 or the first switch 202. At the expense of extra circuitry, the first switch 202 can keep track of which originating port was sending the most frames to the congested queue, and modify the flow control messages accordingly.

After a port has received a flow control message (this port is referred to as the paused port), it would ideally wait until the congested queue 208 drains substantially before resuming sending. However, if the paused port waits too long and the queue 208 empties, the first port of the first switch 202 may temporarily have nothing to send, reducing its data rate. Controlling the duration (referred to as pause time) for a paused port to assert flow control can be accomplished in a number of ways.

One approach is for the queue that was once congested to send a complementary unpause flow control congestion message to ports that it had previously paused. This requires that each queue maintain a table of all ports that it has sent flow control congestion messages to since becoming congested. Allocating a static table that could contain every possible port of every possible connected switch would occupy a large amount of memory, most of which would never be used. Dynamically allocating memory to maintain this table is even more complex. In addition, if the switch device does not have the capacity to generate arbitrary messages, this facility would need to be added to generate the unpause flow control congestion messages.

Another approach is to send a global unpause congestion message to all other switches when a queue is no longer congested. This approach will unpause all ports, even those that have been paused by still-congested queues. Extra flow control traffic will result to re-pause ports that were erroneously unpaused by the global unpause congestion message. In the meantime, ports that have erroneously resumed transmitting may cause queues to overflow, and drop frames, before they can be repaused. This approach also requires the ability to independently generate a frame.

A further approach would be to send an unpause congestion message that contains the port number and device number of the now uncongested queue to all switches. This places the burden on all paused ports to keep a table of what ports have paused them. In addition to the disadvantages of the first approach relating to maintenance of a table, a single port may have been paused at different times by different queues. The port would therefore need to determine how long it should remain paused based on the previously received flow control congestion messages from the still-congested ports.

A final approach is to send pertinent information inside the flow control message to the port that is to be paused so that the paused port itself can determine its pause time. This information may include the speed of the congested port, how many ports are transmitting to the congested port, and how much space remains in the queue. With this information, the paused port can make an estimate of how long it should remain paused for, and upon the termination of this time, resume sending. If the pause time was not great enough, the queue will become congested once again and send another flow control congestion message.

An advantage of this open-loop approach is that the paused port will, at the end of its pause time, resume sending and not wait indefinitely for an unpause congestion message from the congested queue. An unpause congestion message might never be sent if the device containing the congested queue is removed from the system or if the unpause congestion message is lost or corrupted between switches. Without a feedback loop, some tuning for a particular application is desirable, possibly using basic assumptions, such as those discussed below in relation to FIG. 9, to guide these choices.

Figure 3:
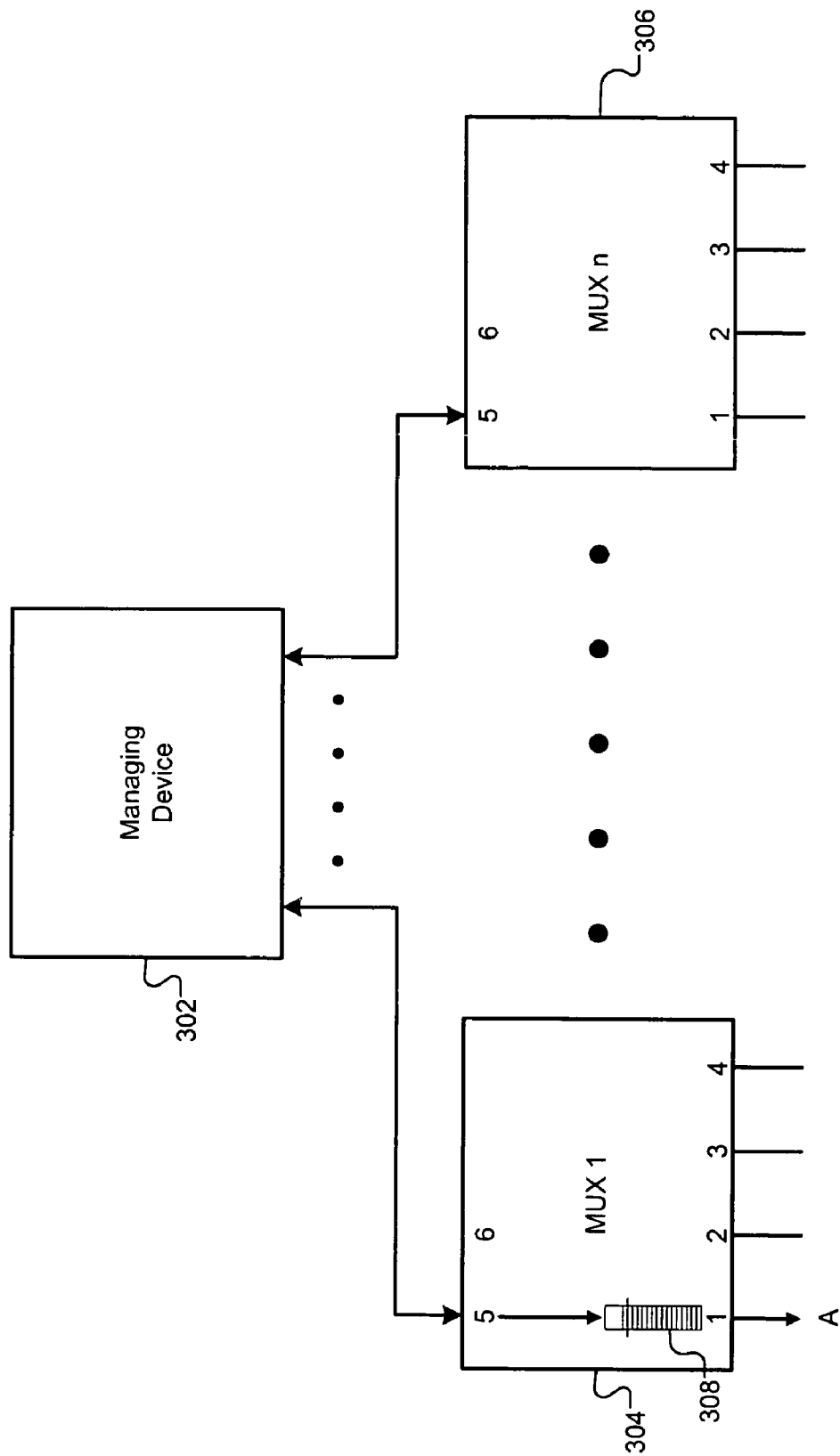
FIG. 3 is a functional block diagram of an exemplary hierarchical interconnection according to the principles of the present invention.

Referring now to FIG. 3, a block diagram of an exemplary hierarchical interconnection according to the principles of the present invention is shown. A managing device 302 communicates with a fifth port of a first switch 304, which is configured to act as a multiplexer (MUX). In other words, the first switch 304 communicates all received data frames to the managing device 302, and transmits frames as specified by the managing device 302. The managing device 302 may communicate with additional switches 306 configured as MUXes. In some implementations, the managing device 302 may be a layer three (or above) switch or a smart layer two switch.

In this application, flow control congestion information communicated from the first switch 304 to the managing device 302 is used by the managing device 302 not to issue flow control from one of its ports, but to moderate the amount of information being sent to the first switch 304. For instance, the managing device 302 knows that a first port of the first switch 304 operates at 10 Mbps, and therefore sends traffic destined for the first port of the first switch 304 at a rate of 10 Mbps. However, if the first port of the first switch 304 is experiencing collisions or downstream flow control, the full 10 Mbps rate can not be achieved, and a queue 308 will begin to fill.

When the queue 308 reaches a certain threshold, the first switch 304 will then communicate flow control congestion information to the managing device 302 to allow the managing device 302 to make appropriate adjustments. If the queue 308 is dominated by frames of a certain priority level, or if there are separate queues for different priority levels, this priority information might also be communicated to the managing device 302. When this priority information is to be communicated, the frame should not be forced to a higher priority to cause faster delivery, as this will overwrite the original priority information. Therefore, a flag to disable priority forcing may be included. Alternately, the original priority information can be stored elsewhere in the flow control frame.

Figure 4:
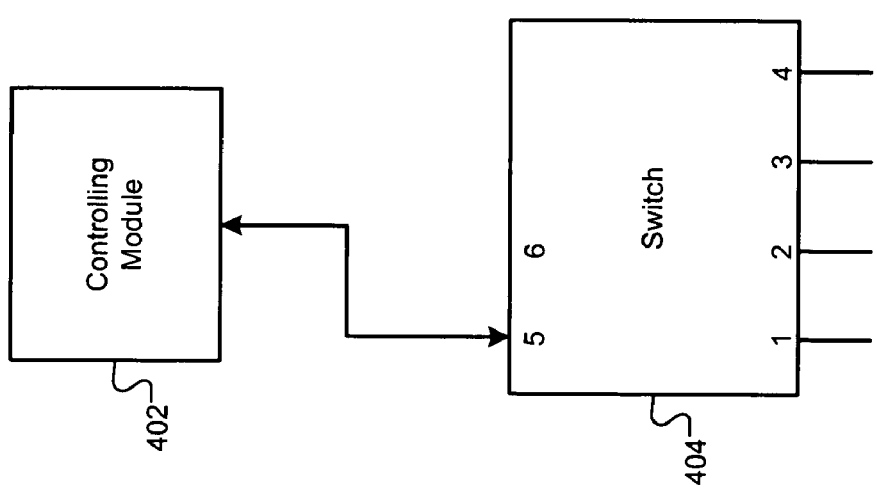
FIG. 4 is a functional block diagram of an exemplary switch control connection according to the principles of the present invention.

Referring now to FIG. 4, a block diagram of an exemplary switch control connection according to the principles of the present invention is depicted. A controlling module 402 communicates with a fifth port of a six-port switch 404. The controlling module 402 may desire to pause or restrict one of the ports of the switch 404. Even if the switch 404 allows the controlling module 402 to specify arbitrary frames to be transmitted out a certain port, a pause frame may be interpreted by the physical interface of the fifth port of the switch 404 and discarded.

By sending a flow control congestion message as described in FIGS. 2 and 3, the controlling module 402 causes the switch 404 to assert and/or deassert flow control on any of its other ports. This mode requires that the switch 404 always respond to flow control congestion messages, even if it is not itself generating flow control congestion messages. Therefore, a flow control disable flag for the switch 404 disables the generation of flow control congestion messages and does not interfere with executing flow control congestion messages from the controlling module 402.

Figure 5:
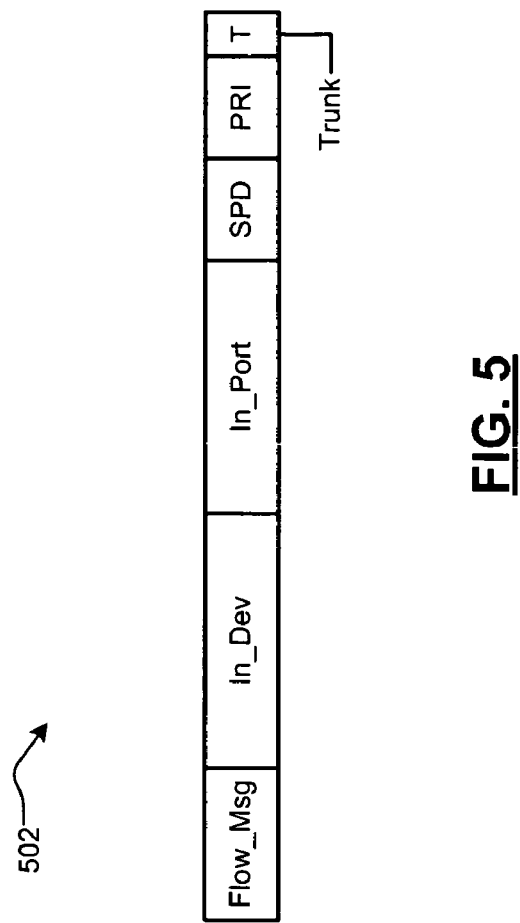
FIG. 5 is a graphical depiction of exemplary fields of transmitted flow control information.

Referring now to FIG. 5, a graphical depiction 502 of exemplary fields of transmitted flow control information is depicted. The message is designated as a flow control congestion message, as contrasted with a data frame. The originating switch of the frame that exceeded the queue threshold may be included. The In_Dev field of the frame is the device identifier of the switch device into which the frame originally entered. This field helps the flow control congestion message get transferred to the original device in a case where the frame must pass through one or more devices on its return trip. The In_Port field of the frame identifies the source port on the In_Dev switch that received the original frame. This is the port that is the target of the flow control congestion messages. For example, a five bit In_Dev field allows for thirty-two switch devices to be interconnected, while a five bit In_Port allows thirty-two ingress ports to be identified.

The line speed (SPD) of the congested switch port is communicated to allow determination of pause time. For example, a two bit field allows for common speeds such as 10 Mbps, 100 Mbps, 1 Gbps, and/or a reserved speed. Frame priority (PRI) may be included, either as a high priority flag to ensure fast delivery, or as data to signify that a certain priority queue is filling up. For example, two or three bits may be used. Whether the ingress port is part of a trunk (T) (discussed below) may be communicated as a single bit.

Figure 6:
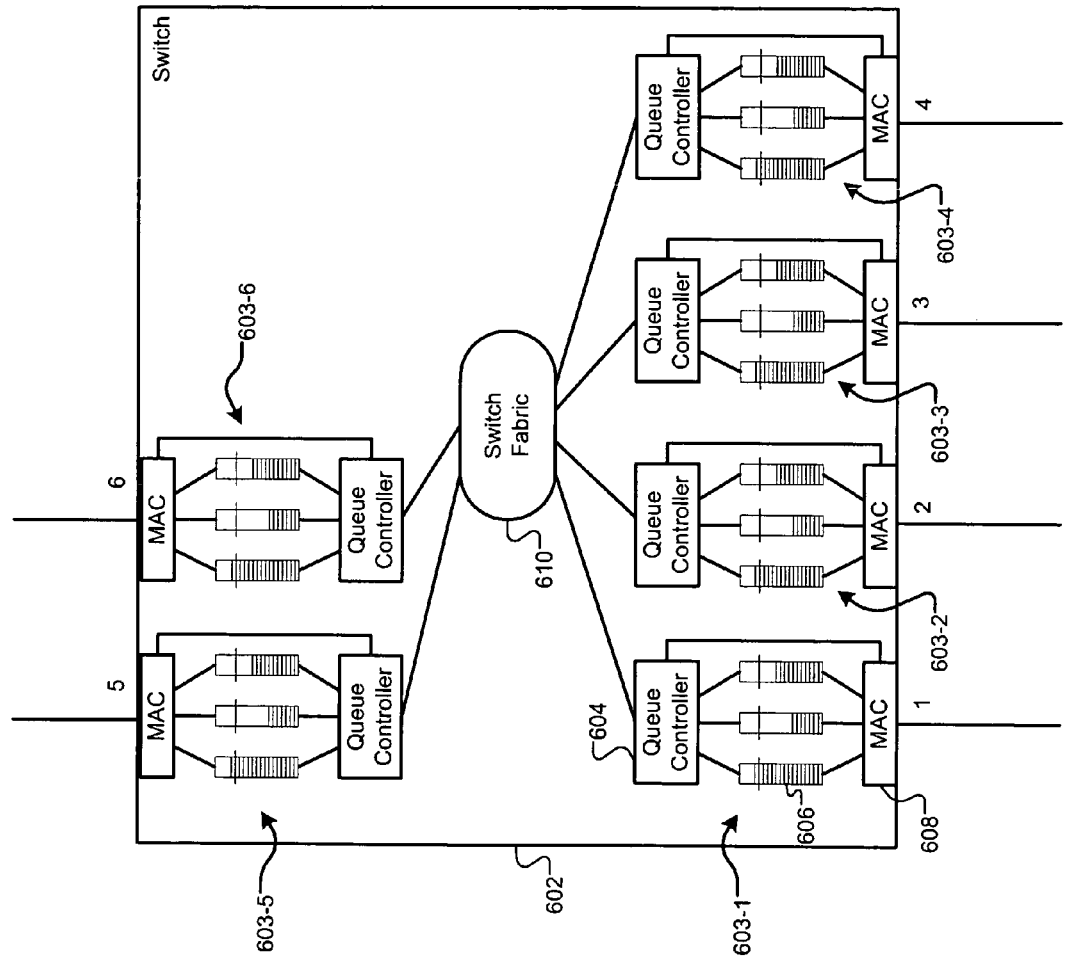
FIG. 6 is a functional block diagram of an exemplary switch according to the principles of the present invention.

Referring now to FIG. 6, a block diagram of an exemplary switch 602 according to the principles of the present invention is depicted. The exemplary switch 602 contains six ports 603-1, 603-2, . . . , and 603-6. Each port contains a queue controller or control module 604, which manages one or more queues 606. For each port, the queues 606 communicate with a MAC (media access control) module 608. The queue control module 604 communicates directly with the MAC module 608 to send information such as flow control scheduling, etc. Each queue control module 604 communicates with a switch fabric 610, which directs frames between the six ports.

One skilled in the art will recognize that storage space for the queues 606 may be shared both between queues for a single port or between queues of all ports. Additionally, there may be a single queue controller for all six ports. When the queue control module 604 generates a flow control congestion message, the message is communicated to the switch fabric 610, which directs it to the appropriate port. Alternately, if out-of-band signaling is used to communicate flow control congestion information, the switch fabric 610 or the queue control module 604 may communicate such information directly to an output module (not shown).

Figure 7:
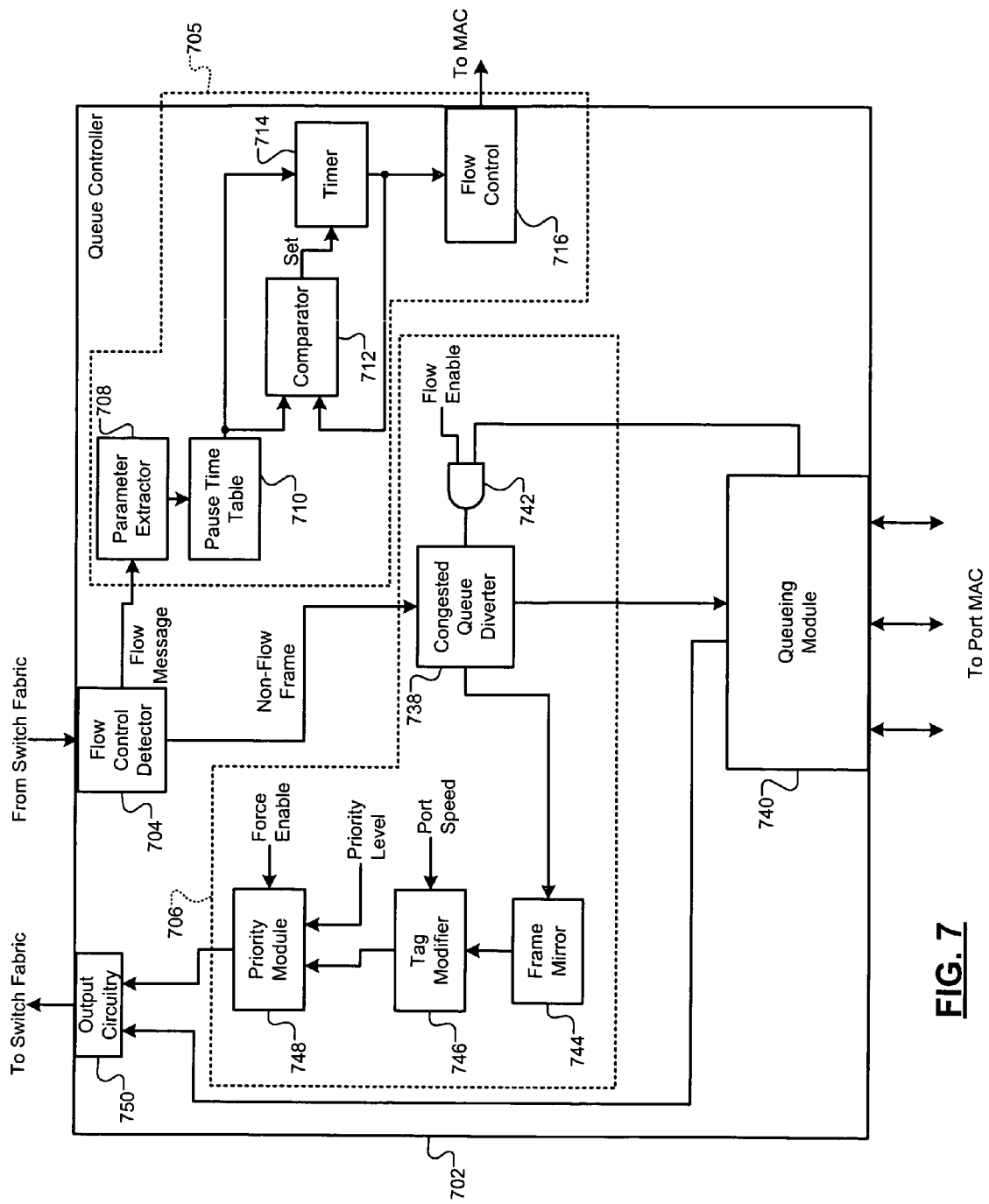
FIG. 7 is a functional block diagram of an exemplary queue control module according to the principles of the present invention.

Referring now to FIG. 7, a block diagram of an exemplary queue control module 702 according to the principles of the present invention is depicted. Frames arriving at the queue control module 702 are interpreted by a flow control congestion message detector 704. The flow control congestion message detector 704 determines if the frame contains flow control congestion information or if it is a non-flow-control frame, such as a standard data frame. Flow control congestion messages are passed to a flow control execution block 705, while other frames are passed to a flow control creation block 706.

Within the flow control execution block 705, a parameter extractor 708 receives the flow control congestion message frame. The parameter extractor module 708 removes parameters of interest from the flow control congestion message and communicates them to a pause time table 710. These parameters may include the speed of the congested queue, the number of ports attempting to send frames to the congested queue, and/or other information. Based upon these parameters and/or internal signals, such as the local port speed, the pause time table 710 selects and/or calculates a time for which flow control should be asserted. This time is communicated to a comparator 712 and a timer 714. A current time value of the timer 714 is communicated to the comparator 712 and a flow control module 716.

In one use of the invention (as in FIG. 2), if the comparator 712 determines that the time from the pause time table 710 is greater than the current time value of the timer 714, a set signal is communicated to the timer 714. The set signal causes the timer 714 to set itself to the time from the pause time table 710. Using the comparator ensures that the port that is causing the congestion is stalled at the rate of the slowest congested port to which it is sending frames.

In another use of the invention (as in FIG. 4), regardless of the comparison result, the set signal is asserted, causing the timer's value to be re-loaded on every received flow control congestion message. Ignoring the comparison result allows the controlling module 402 to re-start the flow of data quickly by sending in a flow control congestion message that produces a zero time value from the pause time table 710. The timer 714 decrements at a set rate—for instance, every 2048 ns. While the timer's current value is non-zero, the flow control module 716 instructs the corresponding MAC module to assert flow control. This flow control may take the form of MAC PAUSE for full-duplex operation or backpressure for half-duplex operation.

Within the flow control congestion message creation block 706, a congested queue diverter 738 receives non-flow-control frames. Of these, non-data frames may receive special processing. Data frames are passed to a queuing module 740. The queuing module 740 places the frame in a queue (unless no space remains, in which case the frame may be dropped). The queuing module 740 communicates a congestion signal to an AND gate 742 if the queue is filled past a certain threshold. This threshold may be dynamic, and may vary with queue levels for other ports.

If flow control congestion messaging is enabled, the AND gate 742 also receives a flow enable signal. An output of the AND gate 742 is communicated to the congested queue diverter 738. The output of the AND gate 742 is an enable signal when both the flow enable and congestion signals are present. If the congested queue diverter 738 receives the enable signal, it sends the data frame to a frame mirror 744. The frame mirror 744 makes a copy of the data frame and passes it to a tag modifier 746.

The tag modifier 746 receives internal signals, such as port speed and/or port ID of the port for this queue controller 702. The tag modifier 746 may also receive other information, such as the number of flow control congestion messages that have been sent by the queue controller 702, the number of frames in the congested queue and/or the number of ports that have sent frames to the congested queue. The tag modifier 746 inserts this information into the mirrored frame. One skilled in the art will recognize that this information can be inserted in a number of places within a frame. If the frame is an Ethernet (or IEEE 802.3) frame, the 802.3ac standard provides an extra four bytes within the Ethernet header. These bytes may be used to transmit the parameters of interest. For further discussion, U.S. patent application Ser. No. 10/829,866, filed Apr. 21, 2004, which is hereby incorporated by reference in its entirety. One skilled in the art will recognize that this approach will also work with other frame types and network protocols.

The modified frame is passed to a priority module 748. If the priority module receives a force enable signal, it will force the priority of the mirrored frame to a level determined by a priority level signal. Forcing the data frame to a high priority will cause it to be transmitted more quickly to the destination switch device. However, unless other provision is made for storing the original priority, the original priority information will be lost. In the exemplary application of FIG. 4, priority may need to be preserved, and so the force enable flag will not be asserted (the frame will remain unchanged through the priority module 748). The output of the priority module 748 is communicated to output circuitry 750. The output circuitry 750 communicates flow control messages and standard data frames from the queuing module 740 to the switch fabric.

Figure 8:
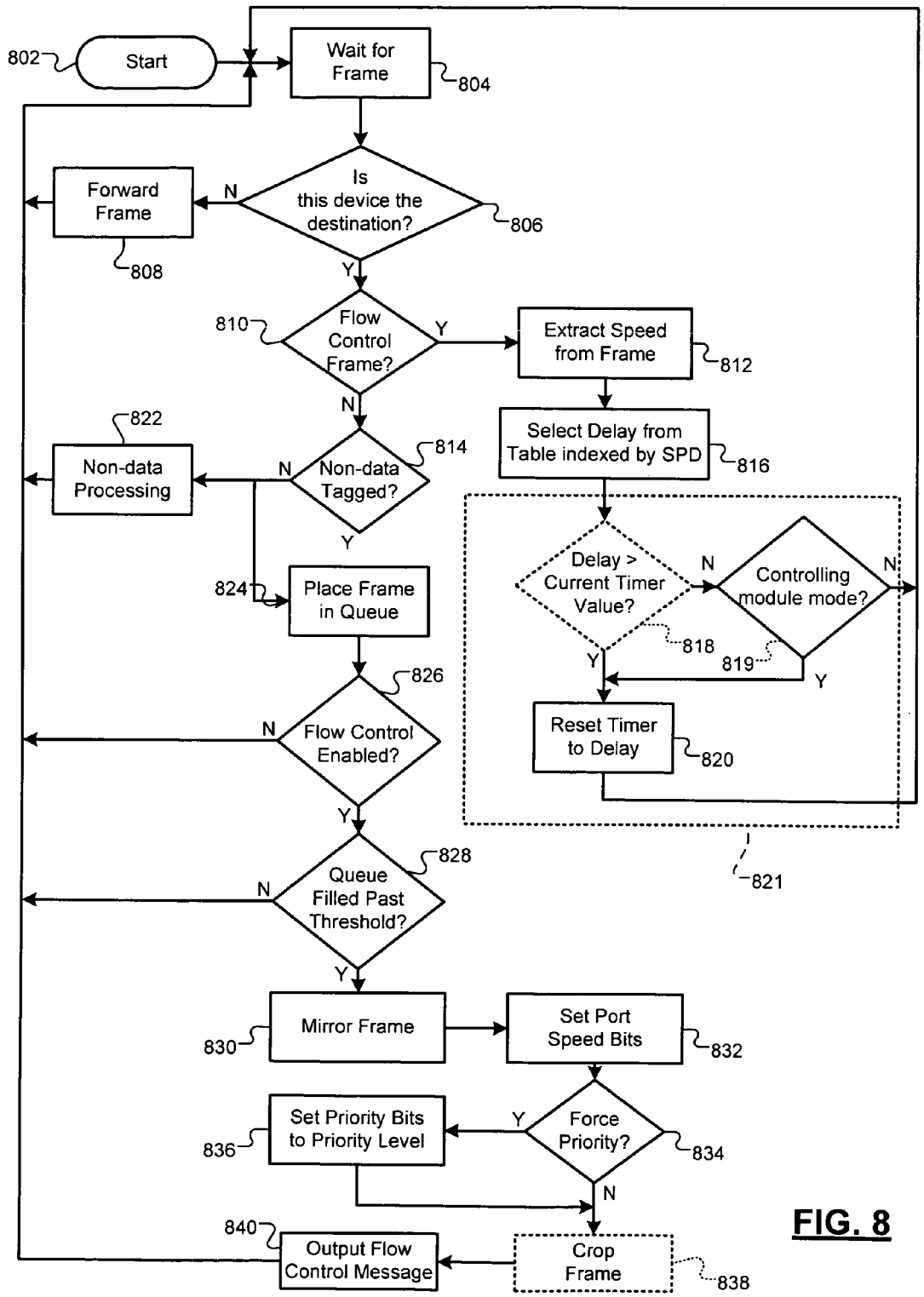
FIG. 8 is a flow chart of exemplary steps performed by the queue control module of FIG. 7.

Referring now to FIG. 8, a flow chart depicts exemplary steps performed by the queue control module of FIG. 7. Control starts at step 802 and transfers to step 804. Control waits for a frame to be received in step 804 and, upon receipt, transfers to step 806. In step 806, the frame is checked to determine if the frame is destined for this switch. If not, control transfers to step 808; otherwise, control transfers to step 810. In step 808, the frame is forwarded to the destination switch, or to the next switch in the path to reach the destination switch. The In_Dev field can be used here to pass flow control congestion messages back to the original source device. Control then returns to step 804.

In step 810, the frame is analyzed to see if it is a flow control congestion message frame. If it is, control transfers to step 812; otherwise, control transfers to step 814. In step 812, congested port speed is extracted from the frame, and control transfers to step 816. In step 816, a delay value is selected from a table indexed by the congested port speed. Control then transfers to step 818, where the selected delay may be compared to the current timer value of the destination port.

If chip to chip flow control congestion messages are being used (as in FIG. 2, for example) and the selected delay is greater than the timer value, control transfers to step 820; otherwise, control returns to step 804. The selected delay may be less than the timer value if the selected delay is due to a flow control message from a faster port (and a corresponding shorter delay time). In step 820, the timer is set to the selected delay value, and control returns to step 804. If a controlling module is sending flow control congestion messages (as in FIG. 4, for example) as determined in step 819, the test of step 818 is ignored in step 819 and control always transfers to step 820, regardless of the new delay value from step 816. If the flow control congestion message indicates that this port was part of a trunk, any of the trunked ports could have been the source of the congesting frame, so each port in the trunk must be paused. To achieve this, steps 818 and 820, denoted as group 821, will be repeated for each trunked port.

In step 814, if the frame is tagged as non-data, control transfers to step 822, where non-data processing is performed, and control returns to step 804. This allows for special frames that may not, or should not, be considered in flow control congestion message generation. Otherwise, the frame is a data frame and control transfers to step 824. In step 824, the frame is enqueued (unless the queue is full, in which case the frame is dropped), and control continues in step 826. If flow control congestion message generation is enabled in step 826, control transfers to step 828; otherwise, control returns to step 804. In step 828, if the queue is filled passed its threshold, control transfers to step 830; otherwise, control returns to step 804.

In step 830, the frame is mirrored to serve as a flow control congestion message, and control transfers to step 832. In step 832, the port speed bits of the flow control congestion message are set to the speed of the congested port, and control transfers to step 834. In step 834, if forcing priority is enabled, control transfers to step 836; otherwise, control transfers to step 838. In step 836, priority bits within the flow control congestion message are set to the given priority level, and control continues in step 838. In step 838, the frame is optionally cropped. Because the frame is being used only as a carrier of flow control congestion information, a maximum size frame of over 1500 bytes is unnecessary. The frame can be truncated to minimum size, as the client data will be discarded upon arrival anyway.

Control then transfers to step 840, where the flow control congestion message type is marked in the frame and the frame is output to the switch fabric pointing toward the port the congesting frame came in on, and control returns to step 804. One skilled in the art will recognize that flow control congestion messages could be generated independently of a mirrored frame. In fact, the physical interface may generate flow control congestion messages itself so that they do not have to wait in the egress queue along with standard data frames.

Referring now to FIG. 9, a table of initial assumptions for determining port pause time is presented. Again, pause time refers to the period during which flow control will be asserted on the switch ingress port that is causing the congestion, and the flow control may take a form other than MAC PAUSE. In an exemplary eleven-port switch having 256 total buffers distributed between its eleven ports, there are approximately 23 buffers per port. Assuming that the pause time should be long enough to allow half of them to empty yields twelve buffers as the determining factor in pause time.

The shortest delay will determine the resolution necessary for the pause timer. For example, a minimum size Ethernet frame is currently 672 bits long, including the interframe gap and preamble, which at 1 Gbps takes 672 ns. Multiplying this minimum time by the number of buffers for flow control, 12, yields 8,064 ns. In order to allow for the estimate to be off by at least half (4,032 ns), the resolution of the pause timer could be 2,048 ns, which is a multiple of a common 16 ns clock period (the next choice, 4,096 ns, is greater than 4,032 ns, and thus too large).

The maximum pause time will likely occur with a 10 Mbps destination port. A maximum size Ethernet frame is 12,336 bits and/or (1522+preamble+IPG). Multiplying 12,336 by 100 ns (bit time at 10 Mbps) and 12 buffers, and dividing by the pause timer resolution (2,048 ns) yields 7,228. This requires a pause time register of 13 bits (8,192). One skilled in the art will recognize that 13 bits are not absolutely necessary, as the pause time may be stored using some form of nonlinear encoding.

A table 900 collects initial assumptions for determining pause time based on speed of the congested port 902 and speed of the paused port 904. The cause 906 assumed to most likely cause the congestion determines what effect 908 the pause should produce. Calculations of pause time 910 are displayed in pause time counter units (divide by 2048 ns) 912.

The first analysis concerns the assumptive cause 906 of congestion when the congested port speed 902 is 10 Mbps. When the paused (transmitting) port 904 is 10 Mbps, congestion could be caused by collisions or downstream flow control at the congested port, or more than two ports transmitting to the congested port. The most likely scenario is that no more than two source ports will be transmitting at full line speed to the destination port. If each transmitting port is slowed by half, the rates will match. A 2 to 1 reduction should allow for the congested port to become uncongested.

When the paused port 904 is 100 Mbps, the most likely cause of congestion is simply the line speed difference. Therefore, a 10 to 1 reduction should allow the queue to become uncongested. Similarly, a paused port 904 operating at 1 Gbps will likely cause congestion because of its hundred-fold speed advantage. A 100 to 1 reduction should therefore be adequate.

The second analysis concerns the assumptive cause 906 of congestion when the congested port speed 902 is 100 Mbps. If the paused port is operating at only 10 Mbps, the congested port must be experiencing collisions or flow control, or there are ports other than the 10 Mbps paused port contributing to the traffic. Because the 10 Mbps is ten times slower than the congested port, a reduction of 1.1 to 1 should be sufficient.

When both ports are operating at 100 Mbps, collisions or more than two ports transmitting to the congested port is the cause of the congestion. It is less likely for more than two ports to be transmitting at full speed to a single port, so a 2 to 1 reduction will likely be appropriate. With a 1 Gbps paused port, tenfold speed disparity is the likely cause of the congestion, and a 10 to 1 reduction will be applied.

The final analysis concerns the assumptive cause 906 of congestion when the congested port speed 902 is 1 Gbps. When the paused port is only 10 Mbps, there must be at least two ports transmitting to the congested port. Because the 10 Mbps port is $\frac{1}{100}$ the speed of the congested port, a 1.01 to 1 reduction will likely be sufficient. Similarly, for a 100 Mbps paused port, a 1.1 to 1 reduction should be sufficient. Finally, with a 1 Gbps paused port, at least two ports must be transmitting to the congested port. Taking the most common scenario of two ports transmitting, a 2 to 1 reduction will be employed.

Table 900 demonstrates that pause times group by the speed of the congested port 902. The speed of the paused port 904 is relatively insignificant. It may therefore be possible to determine three pause times based solely upon the speed of the congested port 902. As pause times are increased, the number of frames dropped within the switch devices is minimized, even if many ports transmit at full line speed to the same congested output port. High pause times, however, can lead to ports pausing so long that the originally congested queue empties, and the port is left with nothing to transmit. This reduction in the speed of the port should be avoided.

If precise traffic patterns are known in advance, the pause times can be tailored so that frames are never dropped and all ports operate at full speed. In the majority of circumstances, traffic patterns are variable, and a compromise must be reached that keeps the pause times small enough to prevent a decrease in port speed, while keeping the times long enough to prevent frames being dropped under most traffic conditions. Under certain extreme traffic conditions (which are usually brief), this compromise will lead to dropped frames.

An experiment began with 401, 41, and 5 timer counts for congested port speeds of 10 Mbps, 100 Mbps, and 1 Gbps, respectively. Experimentation showed that optimal pause times did cluster together based upon congested port speed— i.e., the speed of the paused port had little effect. However, the size of transmitted frames was found to affect the optimal pause times. When many of the frames transmitted are larger than minimum size, the pause times above were found to be too low due to the change in buffer efficiency and the time it took to drain the frames. The numbers presented here assume a fixed allocation of about 23 buffers per port where approximately half full is used as the congestion threshold. The number of available buffers and how the threshold of congestion is determined will affect the delay times.

The open loop flow control messaging system is designed to cover the majority of typical network congestion cases with minimal system cost. But not all cases can be covered with such a simple solution. If extraordinary traffic patterns occur, the original IEEE PAUSE link-based flow control mechanism can be used. In one embodiment, two thresholds are set for each output queue. A lower threshold determines when to generate the mirrored flow control congestion messages discussed above, and a higher threshold determines when to generate standard IEEE link PAUSE frames on the inter-switch links (ports 5 and 6 in FIG. 2).

For example, if 100 Mbps ports 1, 2, and 4 in Switch 2 send frames to the 10 Mbps Switch 1 Port 1 (Stream A), the flow control congestion message delay time may not be large enough. The Switch 1 Port 1 buffers will fill three times faster (from the three 100 Mbps ports) but drain at the same 10 Mbps rate. The delay time is often calibrated to handle up to two streams. More steams can be supported if there is more buffering available, or if Switch 1 Port 1 is allowed to drop below 10 Mbps (the delay time can be set high enough to cause the buffers to completely drain).

In this case, the output queue for Switch 1 Port 1 will continue filling as the delay times expire and will eventually pass a second, higher, threshold. At this point, a standard IEEE link PAUSE can be used to stop all traffic coming in Port 6 on Switch 1. When this occurs, Stream B will also be blocked until the output queue of Switch 1 Port 1 drains enough to release the IEEE PAUSE on the link. This fall-back mechanism prevents frame loss at the expense of some head of line blocking during peak congestion situations. Real networks generally have only momentary congestion and the flow control congestion message system handles these cases without any head of line blocking.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network switching system comprising:
a managing device; and
a first switching device comprising:
   first and second ports, wherein said first port communicates with said managing device;
   a queue that communicates with said second port, that stores frames for later output by said second port, and that generates a congestion signal when filled above a threshold; and
   a control module that is distinct from said managing device and that directs frames received from said second port to said first port, and that selectively sends an outgoing flow control message to said first port when said congestion signal is present.

2. The network switching system of claim 1 wherein said managing device uses said outgoing flow control messages to determine a rate at which to send data frames to said first switching device.

3. The network switching system of claim 1 wherein said managing device communicates with said first port via one of a network link and a dedicated interconnection link.

4. The network switching system of claim 1 wherein at least one of said threshold is dynamically set based upon a number of free buffers within said first switching device and said threshold is set to a predetermined value based upon experimental results.

5. The network switching system of claim 1 wherein said control module selectively instructs said second port to assert flow control when a flow control message is received from said first port if said received flow control message designates said second port as a target.

6. The network switching system of claim 5 wherein said first switching device further comprises a timer, wherein said second port asserts flow control until said timer expires, wherein said control module selectively resets said timer to a reset time when a flow control message is received, wherein said received flow control message contains remote port speed information and wherein said reset time is based upon said remote port speed information.

7. The network switching system of claim 6 wherein said control module selectively resets said timer when said reset time is greater than a current value of said timer.

8. The network switching system of claim 5 further comprising a third port, wherein if a trunk includes said second and third ports, said control module instructs both of said second and third ports to assert flow control.

9. The network switching system of claim 5 wherein said flow control comprises one of a MAC PAUSE and backpressure.

10. The network switching system of claim 5 wherein said first switching device further comprises an input buffer for said second port, wherein said flow control comprises storing frames received by said second port in said input buffer.

11. The network switching system of claim 1 wherein said control module selectively sends an outgoing flow control message when a flow control enable flag is set.

12. The network switching system of claim 1 wherein at least one of:
a modified copy of one of said frames serves as said outgoing flow control message;
said outgoing flow control message is based on an IEEE 802.3 frame;
said outgoing flow control message includes target device and target port information;
said control module designates a target of said outgoing flow control message to be a port of a device corresponding to a frame that filled said queue above said threshold; and
wherein said target of said outgoing flow control message is the port of the device corresponding to the frame that filled said queue above said threshold.

13. The network switching system of claim 1 wherein said outgoing flow control message includes trunk information of a port of a device corresponding to a frame that filled said queue above said threshold.

14. The network switching system of claim 1 wherein said outgoing flow control message includes a speed of said second port.

15. The network switching system of claim 14 wherein said outgoing flow control message is based on an IEEE 802.3 frame, and said speed is stored in a four-byte IEEE 802.3ac frame extension.

16. The network switching system of claim 1 wherein a priority of said outgoing flow control message is selectively set to high priority.

17. The network switching system of claim 16 wherein said priority of said outgoing flow control message is selectively set to said high priority when a priority forcing flag is set.

18. The network switching system of claim 1 wherein said managing device includes one of a layer two switch and a layer three switch.

19. The network switching system of claim 1 wherein said first switching device further comprises a third port, and wherein said control module directs frames received from said third port to said first port.

20. The network switching system of claim 1 further comprising a second switching device according to claim 1, wherein said managing device uses said outgoing flow control messages from both said first and second switching devices to determine rates at which to send frames to said first and second switching devices, respectively.

21. A network switching system comprising:
managing means for managing; and
first switching means for switching comprises:
first and second port means for communicating, wherein said first port means communicates with said managing means;
queue means for storing that communicates with said second port means, for storing frames for later output by said second port means, and for generating a congestion signal when filled above a threshold; and
control means for directing frames received from said second port means to said first port means, and for selectively sending an outgoing flow control message to said first port means when said congestion signal is present,
wherein the control means is distinct from the managing means.

22. The network switching system of claim 21 wherein said managing means uses said outgoing flow control messages to determine a rate at which to send data frames to said first switching means.

23. The network switching system of claim 21 wherein said managing means communicates with said first port means via one of a network link and a dedicated interconnection link.

24. The network switching system of claim 21 wherein at least one of said threshold is dynamically set based upon a number of free buffers within said first switching means and said threshold is set to a predetermined value based upon experimental results.

25. The network switching system of claim 21 wherein said control means selectively instructs said second port means to assert flow control when a flow control message is received from said first port means if said received flow control message designates said second port means as a target.

26. The network switching system of claim 25 wherein said first switching means further comprises a timing means, wherein said second port means asserts flow control until said timing means expires, wherein said control means selectively resets said timing means to a reset time when a flow control message is received, wherein said received flow control message contains remote port speed information and wherein said reset time is based upon said remote port speed information.

27. The network switching system of claim 26 wherein said control means selectively resets said timing means when said reset time is greater than a current value of said timing means.

28. The network switching system of claim 25 further comprising third port means for communicating, wherein if a trunk includes said second and third port means, said control means instructs both of said second and third port means to assert flow control.

29. The network switching system of claim 25 wherein said flow control comprises one of a MAC PAUSE and backpressure.

30. The network switching system of claim 25 wherein said first switching means further comprises input buffer means for storing for said second port means, wherein said flow control comprises storing frames received by said second port means in said input buffer.

31. The network switching system of claim 21 wherein said control means selectively sends an outgoing flow control message when a flow control enable flag is set.

32. The network switching system of claim 21 wherein at least one of:
- a modified copy of one of said frames serves as said outgoing flow control message;
- said outgoing flow control message is based on an IEEE 802.3 frame;
- said outgoing flow control message includes target device and target port information;
- said control means designates a target of said outgoing flow control message to be a port means of a device corresponding to a frame that filled said queue means above said threshold; and
- wherein said target of said outgoing flow control message is the port means of the device corresponding to the frame that filled said queue means above said threshold.

33. The network switching system of claim 21 wherein said outgoing flow control message includes trunk information of a port of a device corresponding to a frame that filled said queue means above said threshold.

34. The network switching system of claim 21 wherein said outgoing flow control message includes a speed of said second port means.

35. The network switching system of claim 34 wherein said outgoing flow control message is based on an IEEE 802.3 frame, and said speed is stored in a four-byte IEEE 802.3ac frame extension.

36. The network switching system of claim 21 wherein a priority of said outgoing flow control message is selectively set to high priority.

37. The network switching system of claim 36 wherein said priority of said outgoing flow control message is selectively set to said high priority when a priority forcing flag is set.

38. The network switching system of claim 21 wherein said managing means includes one of a layer two switch and a layer three switch.

39. The network switching system of claim 21 wherein said first switching means further comprises third port means for communicating, and wherein said control means directs frames received from said third port means to said first port means.

40. The network switching system of claim 21 further comprising a second switching means according to claim 21, wherein said managing means uses said outgoing flow control messages from both said first and second switching means to determine rates at which to send frames to said first and second switching means, respectively.

41. The network switching system of claim 1 wherein said managing device controls flow of said frames from a second switching device to said first switching device based on said outgoing flow control message,
wherein the second switching device is distinct from the first switching device.

42. The network switching system of claim 1 wherein said first switching device is distinct from said managing device.

43. The network switching system of claim 1 wherein said frames are received by said first port,
wherein said control module directs said frames to said managing device via said first port, and
wherein said second port outputs said frames to a second switching device that is distinct from said managing device and said first switching device.

44. The network switching system of claim 43 wherein said control module directs said frames to said second port.

45. The network switching system of claim 1 wherein said control module directs said frames received from said second port to said first port after reception of said frames by at least one of said first port and a third port.

46. The network switching system of claim 1 wherein said first switching device receives said frames at a first rate and said control module sends said flow control message to said managing device to adjust transmission rate of said frames to a second rate that is greater than zero and less than said first rate.

47. The network switching system of claim 46 wherein said first switching device receives said frames from a second switching device that is distinct from the managing device and the first switching device, and
wherein said second switching device adjusts said transmission rate of said frames to said first switching device based on said flow control message.

48. The network switching system of claim 1 wherein said flow control message comprises a speed of a queue, and
wherein said control module selects a delay based on said speed of said queue, adjusts a timer based on said delay, and generates said flow control message based on said timer.

49. The network switching system of claim 48 wherein said first switching device comprises said queue.

50. The network switching system of claim 49 wherein said first switching device receives said frames from a second switching device at a rate that is based on said timer.

\* \* \* \* \*